United States Patent
Masuda et al.

(10) Patent No.: US 10,025,453 B2
(45) Date of Patent: Jul. 17, 2018

(54) SCREEN SHARING SYSTEM, SCREEN SHARING METHOD, AND STORAGE MEDIUM

(71) Applicants: Yusaku Masuda, Kanagawa (JP); Ryohichi Baba, Kanagawa (JP); Keishi Iwata, Kangawa (JP)

(72) Inventors: Yusaku Masuda, Kanagawa (JP); Ryohichi Baba, Kanagawa (JP); Keishi Iwata, Kangawa (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 15/067,417

(22) Filed: Mar. 11, 2016

(65) Prior Publication Data

US 2016/0196011 A1 Jul. 7, 2016

Related U.S. Application Data

(63) Continuation of application No. 14/751,281, filed on Jun. 26, 2015, now Pat. No. 9,317,247, which is a (Continued)

(30) Foreign Application Priority Data

Oct. 26, 2010 (JP) ................. 2010-240005
Jul. 29, 2011 (JP) ................. 2011-167715

(51) Int. Cl.
*G06F 3/0481* (2013.01)
*G06F 3/14* (2006.01)
(Continued)

(52) U.S. Cl.
CPC .......... *G06F 3/0481* (2013.01); *G06F 3/0484* (2013.01); *G06F 3/04842* (2013.01);
(Continued)

(58) Field of Classification Search
CPC .. G06F 3/0484; G06F 3/1454; G06F 3/04842; H04L 67/10
See application file for complete search history.

(56) References Cited

U.S. PATENT DOCUMENTS 5,537,545 A 7/1996 Okuyama et al.
6,584,493 B1 6/2003 Butler
(Continued)

FOREIGN PATENT DOCUMENTS

| JP | H07-044503 | 2/1995 |
| JP | H07-298235 | 11/1995 |

(Continued)

OTHER PUBLICATIONS

Japanese Office Action for 2016-216614 dated Nov. 7, 2017.
(Continued)

*Primary Examiner* — Abbas Abdulselam
(74) *Attorney, Agent, or Firm* — IPUSA, PLLC

(57) ABSTRACT

A screen sharing system includes information processing apparatuses that display the same content on their respective screens as a shared screen. Each of the information processing apparatuses includes an operation right switching unit configured to acquire an operation right, a transmission data generating unit configured to generate transmission data including operational information of an input operation, and a drawing unit configured to draw a display object on the screen. At a transmitting information processing apparatus with the operation right, the drawing unit draws the display object according to the operational information, and the transmission data generating unit generates the transmission data including the operational information and sends the transmission data to a receiving information processing apparatus without the operation right. At the receiving information processing apparatus, the drawing unit draws the display object according to the operational information (Continued)

in the transmission data received from the transmitting information processing apparatus.

12 Claims, 16 Drawing Sheets

Related U.S. Application Data continuation of application No. 14/257,062, filed on Apr. 21, 2014, now Pat. No. 9,098,230, which is a continuation of application No. 13/272,283, filed on Oct. 13, 2011, now Pat. No. 8,743,022.

(51) Int. Cl.
*G06F 3/0484* (2013.01)
*H04L 29/08* (2006.01)

(52) U.S. Cl.
CPC ............ *G06F 3/1454* (2013.01); *H04L 67/10* (2013.01); *G09G 2350/00* (2013.01)

(56) References Cited

U.S. PATENT DOCUMENTS

| | | | |
|---|---|---|---|
| 7,283,671 B2 | 10/2007 | Hiroi et al. | |
| 7,423,213 B2 | 9/2008 | Sitrick | |
| 7,634,533 B2 | 12/2009 | Rudolph et al. | |
| 7,774,505 B2 | 8/2010 | Kang et al. | |
| 8,887,189 B2 | 11/2014 | Beyabani | |
| 2002/0087350 A1 | 7/2002 | Miida et al. | |
| 2003/0207244 A1 | 11/2003 | Sakai et al. | |
| 2004/0024819 A1 | 2/2004 | Sasaki et al. | |
| 2004/0148378 A1 | 7/2004 | Koide et al. | |
| 2005/0044126 A1 | 2/2005 | Oogaki et al. | |
| 2006/0147891 A1 | 7/2006 | Dreyfous et al. | |
| 2006/0167954 A1 | 7/2006 | Fujiki et al. | |
| 2006/0282548 A1 | 12/2006 | Yoshida et al. | |
| 2009/0010551 A1 | 1/2009 | Matsuda | |
| 2012/0098733 A1 | 4/2012 | Masuda et al. | |

FOREIGN PATENT DOCUMENTS

| | | |
|---|---|---|
| JP | H08-241280 | 9/1996 |
| JP | H09-062630 | 3/1997 |
| JP | H09-330281 | 12/1997 |
| JP | H10-040058 | 2/1998 |
| JP | 2000-066968 | 3/2000 |
| JP | 2000-099233 | 4/2000 |
| JP | 2001-320370 | 11/2001 |
| JP | 2001-331428 | 11/2001 |
| JP | 2002-132993 | 5/2002 |
| JP | 2002-269293 | 9/2002 |
| JP | 2003-085131 | 3/2003 |
| JP | 2003-123000 | 4/2003 |
| JP | 2004-110573 | 4/2004 |
| JP | 2004-265193 | 9/2004 |
| JP | 2005-244866 | 9/2005 |
| JP | 2005-318589 | 11/2005 |
| JP | 2006-091938 | 4/2006 |
| JP | 2007-018246 | 1/2007 |
| JP | 2007-316265 | 12/2007 |
| JP | 2008-147874 | 6/2008 |
| JP | 2008-148328 | 6/2008 |
| JP | 2009-011563 | 1/2009 |
| JP | 2010-185794 | 8/2010 |

OTHER PUBLICATIONS

Japanese Office Action dated Sep. 30, 2014.
Japanese Office Action dated Apr. 28, 2015.
Japanese Office Action dated Feb. 2, 2016.
Japanese Office Action dated Apr. 19, 2016.
Japanese Office Action dated May 24, 2016.
Japanese Office Action dated Aug. 23, 2016.

| PAGE TURNING | (Page=5) |

| POINTER | (x=100, y=20) |

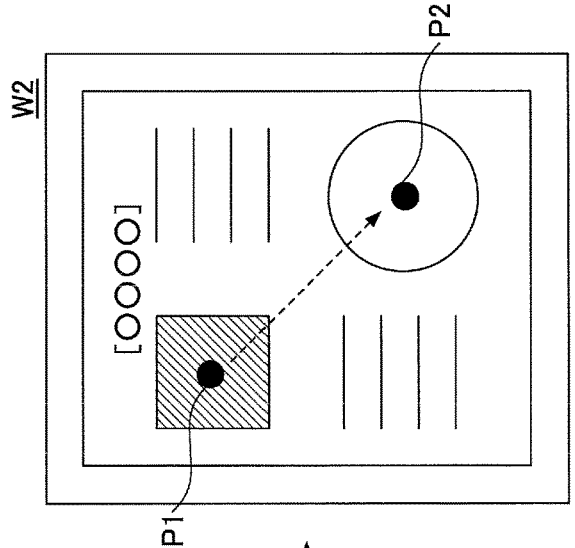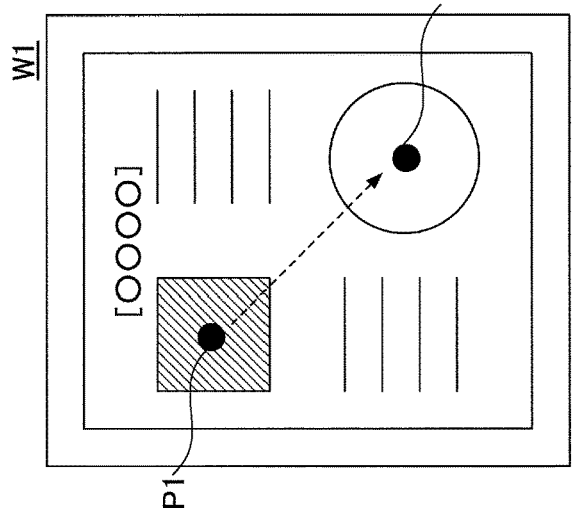

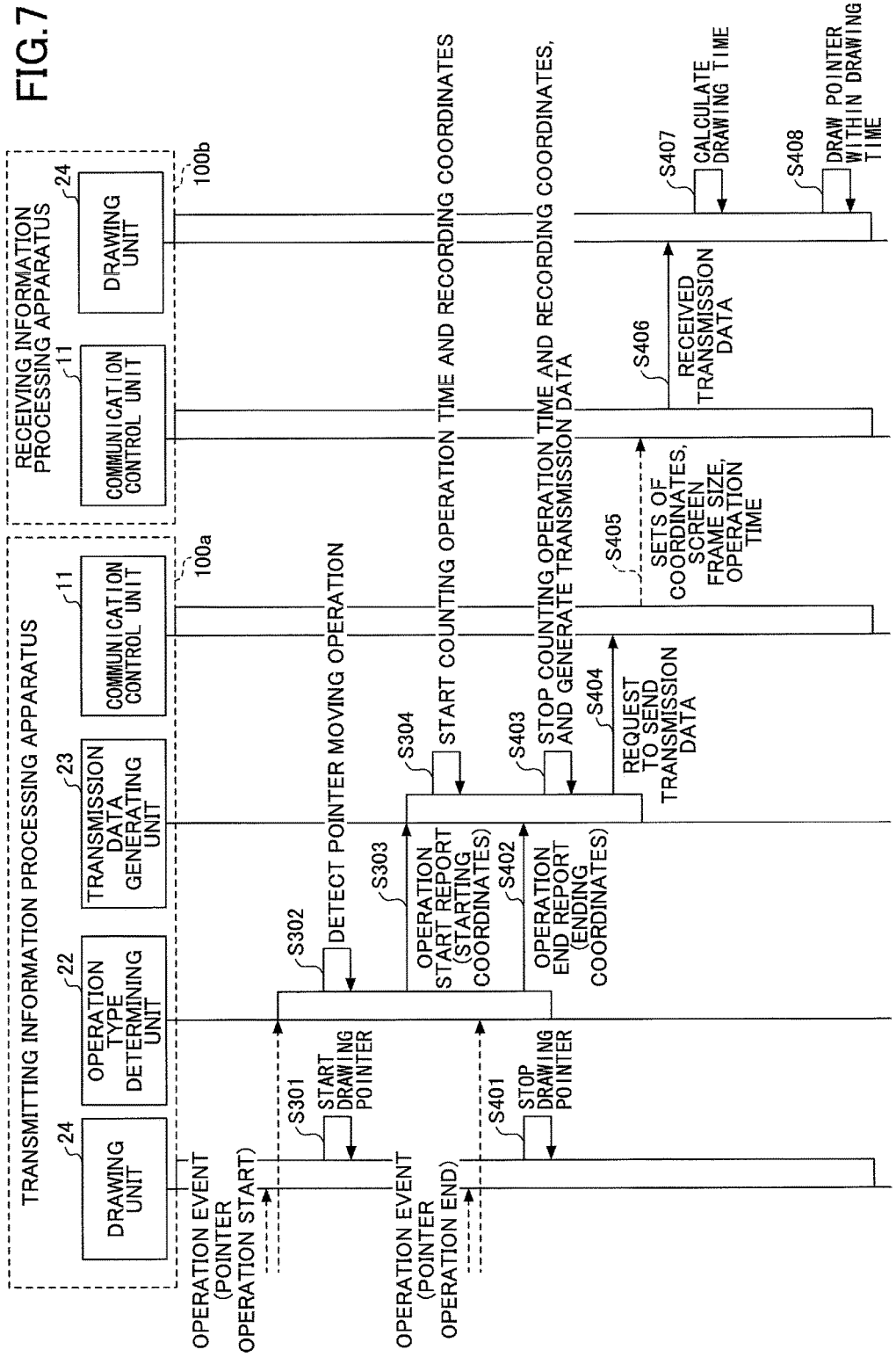

FIG.8

| POINTER | (x=100,y=20 : x=101,y=20 : x=103,y=20), (fsize=768x1024), (time=0.4) |

23D₂

SCREEN SHARING SYSTEM, SCREEN SHARING METHOD, AND STORAGE MEDIUM

CROSS-REFERENCE TO RELATED APPLICATIONS

The present application is a continuation application of U.S. patent application Ser. No. 14/751,281, which is a continuation application of U.S. patent application Ser. No. 14/257,062, which is a continuation application of U.S. patent application Ser. No. 13/272,283, and is based upon and claims the benefit of priority of Japanese Patent Application No. 2010-240005 filed on Oct. 26, 2010 and Japanese Patent Application No. 2011-167715 filed on Jul. 29, 2011, the entire contents of which are incorporated herein by reference.

BACKGROUND OF THE INVENTION

1. Field of the Invention

A certain aspect of this disclosure relates to a technology for sharing a display screen.

2. Description of the Related Art

For example, Japanese Laid-Open Patent Publication No. 2005-318589 discloses a technology that makes it possible to exchange information in real time in a multimedia conference. In the disclosed technology, a server captures a display screen of a client terminal and provides the captured screen to other client terminals.

Thus, in a related-art technology, screen information is sent and received in real time among multiple information processing apparatuses having a communication function to share a display screen. Such a technology for sharing a display screen is used, for example, in a conference where participants discuss a topic while viewing the same document.

With the related-art technology, however, the load of communications among information processing apparatuses for sharing a display screen and the processing load of the information processing apparatuses in drawing received screens tend to become high.

With the related-art technology, image data (screen information) of a display screen are sent and received among information processing apparatuses. Also with the related-art technology, it is necessary to send and receive image data frequently (at a high communication frequency) to improve real-time screen sharing. Thus, the related-art technology increases the amount of data sent and received among information processing apparatuses and increases the communication and processing loads.

These problems may also increase the time necessary for screen sharing (e.g., communication time and screen drawing time) and thereby degrade real-time screen sharing. Apparently, it is preferable to perform real-time screen sharing by sending and receiving a smaller amount of data among information processing apparatuses.

SUMMARY OF THE INVENTION

In an aspect of this disclosure, there is provided a screen sharing system including information processing apparatuses connected to each other via a data communication channel and configured to display the same content on their respective screens as a shared screen. Each of the information processing apparatuses includes an operation right switching unit configured to acquire an operation right for performing an input operation on the shared screen in response to an operation right request entered by a user, a transmission data generating unit configured to generate transmission data including operational information of the input operation, and a drawing unit configured to draw a display object on the screen. One of the information processing apparatuses that has acquired the operation right functions as a transmitting information processing apparatus and each of the other information processing apparatuses without the operation right functions as a receiving information processing apparatus. At the transmitting information processing apparatus, the drawing unit draws the display object according to the operational information of the input operation performed by the user, and the transmission data generating unit generates the transmission data including the operational information and sends the transmission data to the receiving information processing apparatus. At the receiving information processing apparatus, the drawing unit draws the display object on the screen according to the operational information in the transmission data received from the transmitting information processing apparatus.

BRIEF DESCRIPTION OF THE DRAWINGS

FIGS. 4A and 4B are drawings illustrating exemplary transmission data including operational information according to the embodiment;

FIG. 6 is a drawing illustrating an exemplary screen of a presenter and an exemplary screen of an audience;

FIG. 7 is a sequence chart illustrating an exemplary process of sharing a screen according to a first variation;

FIG. 8 is a drawing illustrating exemplary transmission data including operational information according to the first variation;

DESCRIPTION OF THE PREFERRED EMBODIMENTS

Preferred embodiments of the present invention are described below with reference to the accompanying drawings.

<System Configuration>

Figure 1A:
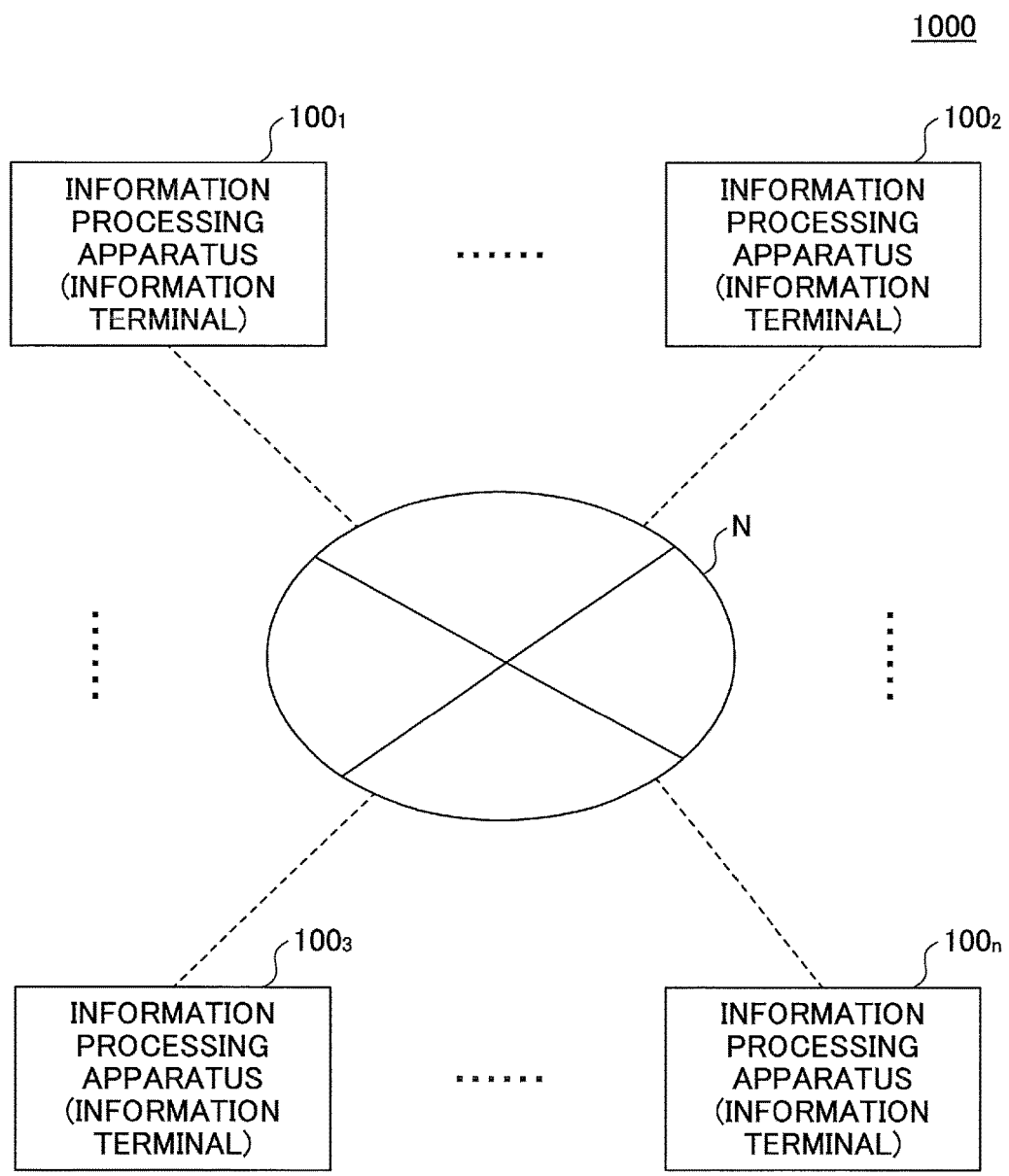
FIGS. 1A and 1B are drawings illustrating an exemplary configuration of a screen sharing system according to an embodiment.
Figure 1B:
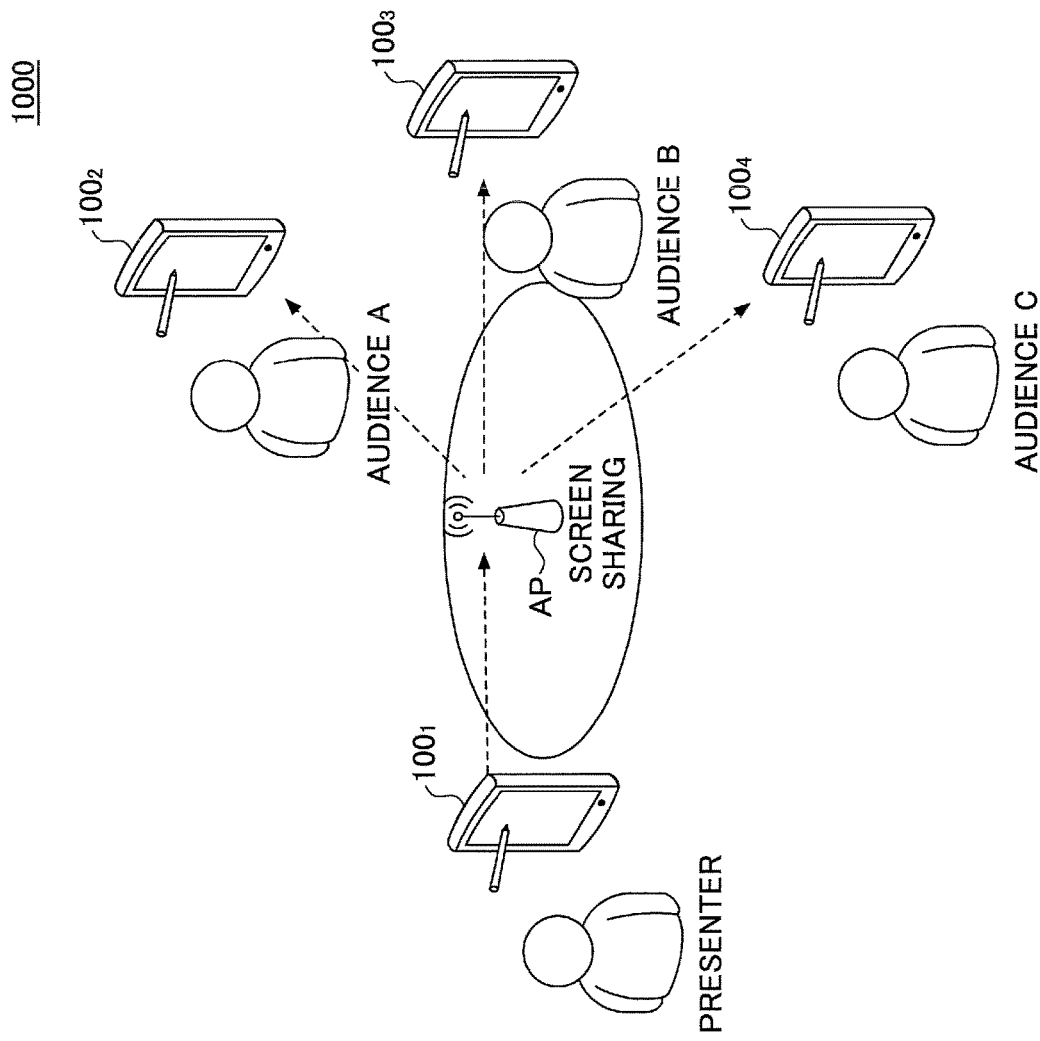

FIGS. 1A and 1B are drawings illustrating an exemplary configuration of a screen sharing system 1000 according to an embodiment.

As illustrated in FIG. 1A, the screen sharing system 1000 includes information processing apparatuses $100_1$-$100_n$ (may be called an information processing apparatus 100 or information processing apparatuses 100 when distinction is not necessary) that are connected via a data communication channel N such as a network (e.g., a local area network (LAN)). In this embodiment, it is assumed that the information processing apparatuses 100 wirelessly communicate with each other, and the data communication channel N is implemented by a wireless LAN or a Bluetooth (trademark or registered trademark) network.

The information processing apparatus 100 may include a radio communication function, an information input function, and an information display function. Also in this embodiment, it is assumed that the information processing apparatus 100 is a portable information terminal such as a smartphone or a tablet PC rather than a desktop personal computer (PC).

FIG. 1B illustrates an exemplary case where the screen sharing system 1000 is used for a presentation meeting. In this exemplary case, the screen sharing system 1000 is used as described below.

The information processing apparatuses $100_1$-$100_4$ detect an access point AP provided in a meeting room and establish connections with a wireless LAN.

Each participant of the presentation meeting starts a screen sharing application (i.e., software that provides a screen sharing function) on one of the information processing apparatuses $100_1$-$100_4$ and displays a presentation material (hereafter called a display content) on the screen. As a result, the display content is shared by the information processing apparatuses $100_1$-$100_4$.

For example, the display content may be stored in a storage area of the information processing apparatus 100 or in a storage area of an external apparatus such as a file server. Each participant of the presentation meeting operates the screen sharing application on the information processing apparatus 100 to access the storage area and thereby obtain the display content.

Here, one of the participants who performs a presentation is called a presenter and other participants are called audiences A, B, and C. The presenter operates the screen sharing application on the information processing apparatus $100_1$ and reports to the audiences A, B, and C that the presenter (or the information processing apparatus $100_1$) has a right (hereafter called an operation right) to perform input operations on a shared screen. For example, the information processing apparatus $100_1$ broadcasts a message indicating acquisition of the operation right to the information processing apparatuses $100_2$-$100_4$ of the audiences A, B, and C.

When an input operation such as a page turning operation or a pointer operation is performed by the presenter, the information processing apparatus $100_1$ sends operational information indicating the input operation to the information processing apparatuses $100_2$-$100_4$. Then, the information processing apparatuses $100_2$-$100_4$ of the audiences A, B, and C reproduce the input operation on their screens based on the operational information. Through the above process, a display screen reflecting an input operation is shared among the information processing apparatuses 100 of the screen sharing system 1000.

With the above configuration, the screen sharing system 1000 can provide a screen sharing service for information processing apparatuses.

<Hardware Configuration>

Figure 2:
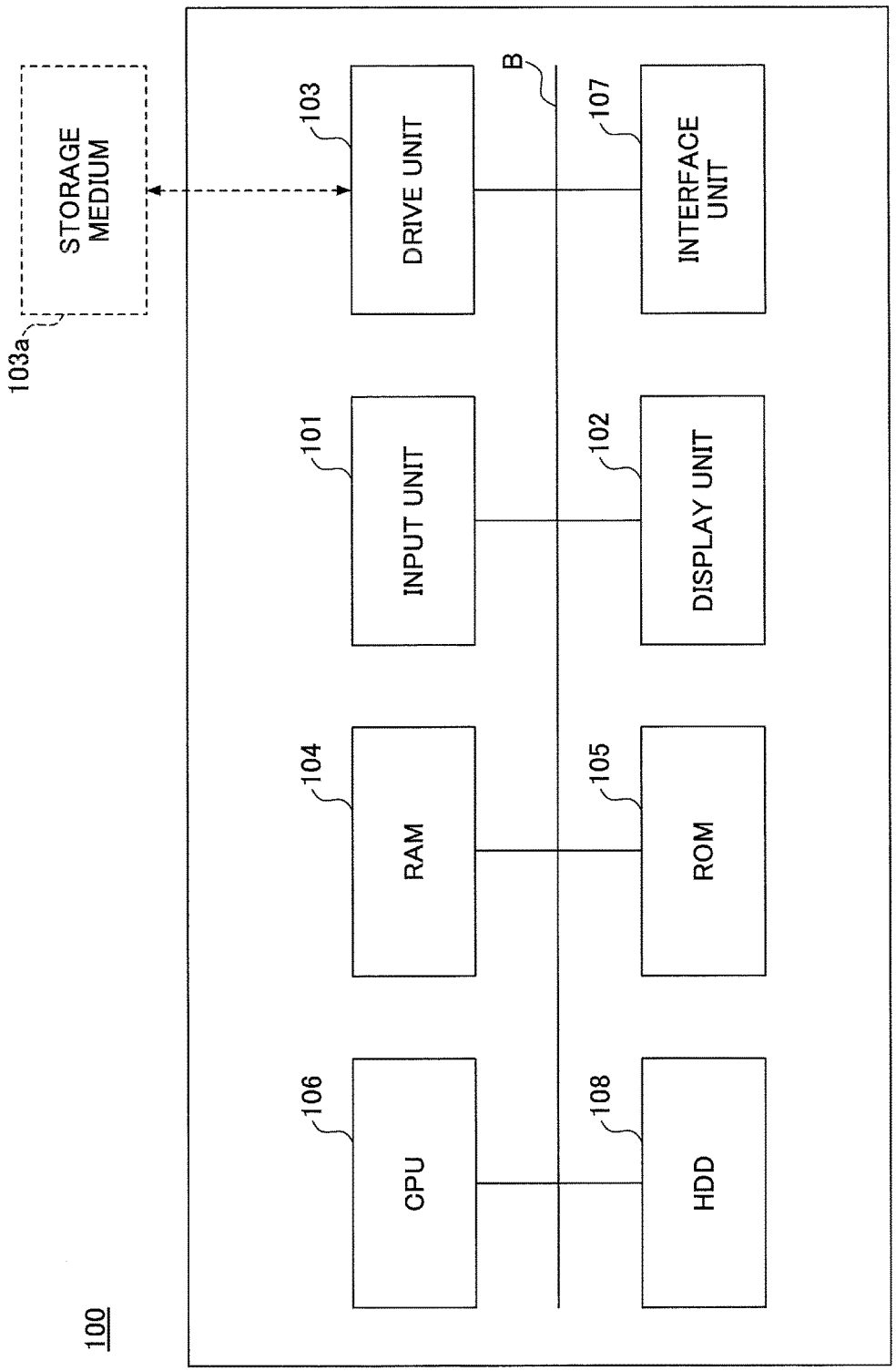
FIG. 2 is a block diagram illustrating an exemplary hardware configuration of an information processing apparatus according to the embodiment.

FIG. 2 is a block diagram illustrating an exemplary hardware configuration of the information processing apparatus 100 according to the embodiment.

As illustrated in FIG. 2, the information processing apparatus 100 may include an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a touch panel and is used to input instructions (or operation signals) to the information processing apparatus 100. The display unit 102 displays, for example, processing results of the information processing apparatus 100.

The interface unit 107 connects the information processing apparatus 100 to the data communication channel N. The information processing apparatus 100 can communicate with other information processing apparatuses 100 via the interface unit 107.

The HDD 108 is a non-volatile storage medium for storing various programs and data. For example, the HDD 108 stores basic software (e.g., an operating system such as Windows (trademark/registered trademark) or UNIX (trademark/registered trademark)) for controlling the entire information processing apparatus 100, and applications (e.g., a screen sharing application) that are executed on the basic software to implement various functions. The HDD 108 may manage the stored programs and data using a file system and/or a database (DB).

The drive unit 103 is an interface between the information processing apparatus 100 and a removable storage medium 103a. The information processing apparatus 100 can read and write data from and to the storage medium 103a via the drive unit 103. Examples of the storage medium 103a include a secure digital (SD) memory card, a universal serial bus (USB) memory, a compact disk (CD), and a digital versatile disk (DVD).

The ROM 105 is a non-volatile semiconductor memory (storage unit) that can retain data even when the power is turned off. For example, the ROM 105 stores programs and data such as a basic input/output system (BIOS) that is executed when the information processing apparatus 100 is turned on, and system and network settings of the information processing apparatus 100. The RAM 104 is a volatile semiconductor memory (storage unit) for temporarily storing programs and data. The CPU 106 loads programs and data from storage units (e.g., the HDD 108 and the ROM 105) into the RAM 104 and executes the loaded programs to control the information processing apparatus 100 and to perform various functions.

With the above hardware configuration, the information processing apparatus 100 can provide various information processing functions (or services).

<Screen Sharing Function>

An exemplary screen sharing function of this embodiment is described below.

In the screen sharing system 1000 of this embodiment, the same content is displayed on the screens of the information processing apparatuses $100_1$ through $100_n$. The information processing apparatus $100_1$ with the operation right sends operational information indicating a performed input operation to the other information processing apparatuses $100_2$ through $100_n$. The information processing apparatuses $100_2$ through $100_n$ receive the operational information and reproduce the input operation on their screens based on the received operational information. The screen sharing system 1000 of this embodiment provides a screen sharing function as described above.

With the related-art technology, the load of communications among information processing apparatuses performed to share a display screen and the processing load of the information processing apparatuses in drawing a received display screen (image data) tend to become high. This is because, with the related-art technology, image data (screen information) of a display screen reflecting a performed input operation are sent and received among information processing apparatuses. Such a configuration makes it necessary to frequently (at a high communication frequency) send and receive a large amount of data among the information processing apparatuses.

These problems of the related-art technology may also increase the time necessary for screen sharing (e.g., communication time and screen drawing time) and thereby degrade real-time screen sharing.

In the screen sharing system 1000 of this embodiment, to prevent or reduce the problems of the related-art technology, a display content is shared beforehand among the information processing apparatuses $100_1$-$100_n$ and only operational information indicating input operations is sent and received (i.e., exchanged) among the information processing apparatuses $100_1$-$100_n$. In other words, in this embodiment, instead of periodically sending and receiving large-size image data, minimum data necessary to reproduce input operations are sent and received among information processing apparatuses sharing basic display data. This configuration makes it possible to reduce the amount of data sent and received among information processing apparatuses.

Thus, the screen sharing system 1000 of this embodiment makes it possible to share a display screen reflecting an input operation by exchanging a small amount of data among information processing apparatuses.

An exemplary functional configuration of the information processing apparatus 100 is described below.

Figure 3:
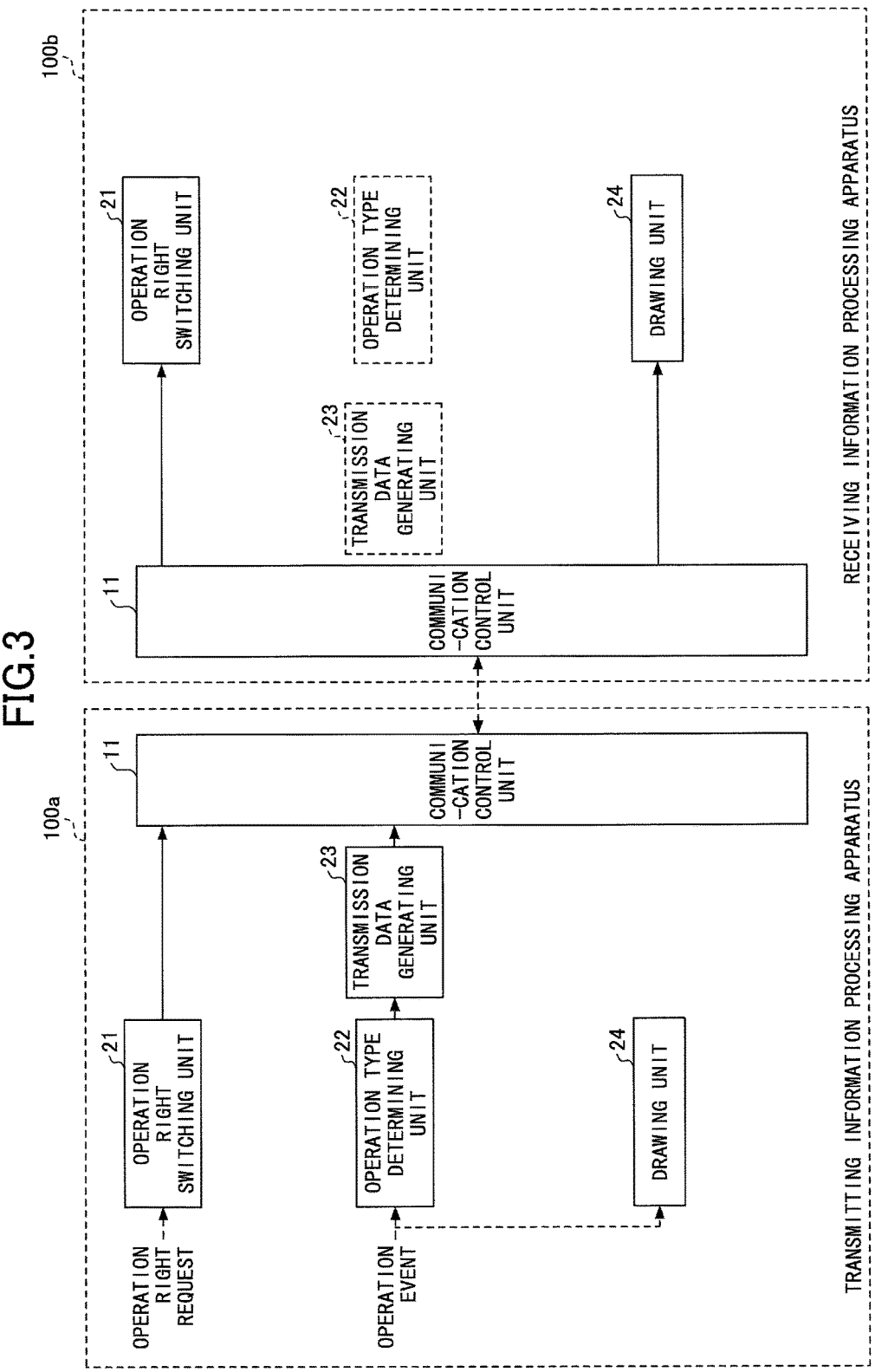
FIG. 3 is a block diagram illustrating an exemplary functional configuration of an information processing apparatus according to the embodiment.

FIG. 3 is a block diagram illustrating an exemplary functional configuration of the information processing apparatus 100 according to the embodiment.

As illustrated in FIG. 3, the information processing apparatus 100 may include a communication control unit 11, an operation right switching unit 21, an operation type determining unit 22, a transmission data generating unit 23, and a drawing unit 24 as functional units. The screen sharing function of this embodiment is implemented through collaboration among the functional units of the information processing apparatuses 100.

The communication control unit 11 is a functional unit that controls communications with other information processing apparatuses 100. More specifically, the communication control unit 11 controls the interface unit 107, and thereby transmits and receives data to and from the other information processing apparatuses 100.

The operation right switching unit 21 is a functional unit that enables transfer of an operation right for performing an input operation on a shared screen from one information processing apparatus 100 to another information processing apparatus 100. The operation right switching unit 21 displays a graphical user interface (GUI) for receiving an operation right request and acquires the operation right when the operation right request is received.

More specifically, when an operation right request is received, the operation right switching unit 21 enables a function (e.g., a touch input function) for receiving input operations on the corresponding information processing apparatus 100, and reports the acquisition of the operation right via the communication control unit 11 to the other information processing apparatuses 100. At the other information processing apparatuses 100, the operation right switching unit 21 receives the report via the communication control unit 11 and disables the function for receiving input operations in response to the report. Through the above process, the operation right on the shared screen is transferred from one information processing apparatus to another information processing apparatus.

The transfer of the operation right results in a change in the direction of data communications among the information processing apparatuses 100. In the example of FIG. 3, an information processing apparatus 100a (hereafter called a transmitting information processing apparatus) has the operation right and sends operational information, and an information processing apparatus 100b (hereafter called a receiving information processing apparatus) does not have the operation right and receives the operational information.

The operation type determining unit 22 is a functional unit that determines the type of input operation. Exemplary input operations or input operation types include a page turning operation and a pointer operation. The operational information sent from the transmitting information processing apparatus 100a varies depending on the type of input operation. Therefore, it is necessary to determine the type of input operation before generating transmission data including the operational information. Different types of input operations input via the input unit 101 are detected as different operation events. The operation type determining unit 22 receives operation events from the input unit 101 and determines the types of input operations based on the received operation events.

The type of input operation may be determined by any other method. For example, when the information processing apparatus 100 employs a software configuration where different program codes (or modules) are executed depending on performed input operations, the operation type determining unit 22 may be configured to determine the type of input operation based on the executed program code (or module).

The transmission data generating unit 23 is a functional unit that generates transmission data including operational information indicating an input operation. The transmission data generating unit 23 generates transmission data based on operational information corresponding to the determined (type of) input operation. For example, the transmission data generating unit 23 generates transmission data as illustrated in FIGS. 4A and 4B.

FIGS. 4A and 4B are drawings illustrating exemplary transmission data including operational information.

In a case where the operation type determining unit 22 determines that a received input operation is a page turning operation, the transmission data generating unit 23 generates transmission data $23D_1$ as illustrated in FIG. 4A. The transmission data $23D_1$ include, as the operational information, a page number or page identification information (page=n) of a page (a destination page) to be displayed as a result of the page turning operation. In a case where the operation type determining unit 22 determines that a received input operation is a pointer operation, the transmission data generating unit 23 generates transmission data $23D_2$ as illustrated in FIG. 4B. The transmission data $23D_2$ include, as the operational information, coordinates or pointer position information (x=a, y=b) indicating the position of the pointer on the screen. Hereafter, "transmission data 23D" may be used as a generic term for the transmission data $23D_1$ and the transmission data $23D_2$.

The transmission data generating unit 23 outputs the generated transmission data 23D to the communication control unit 11 and requests the communication control unit 11 to send the transmission data 23D. With this configuration, only the minimum data necessary to reproduce an input operation on the screen are exchanged among the information processing apparatuses 100.

The operation type determining unit 22 and the transmission data generating unit 23 are activated and deactivated depending on whether the information processing apparatus 100 has the operation right. In the example of FIG. 3, the operation type determining unit 22 and the transmission data generating unit 23 of the information processing 100a having the operation right are activated. Meanwhile, the operation type determining unit 22 and the transmission data generating unit 23 of the information processing 100b having no operation right are deactivated.

The drawing unit 24 is a functional unit that draws a display object on the screen. The drawing unit 24 draws a display object according to a received operation event or operational information in received transmission data. For example, the drawing unit 24 draws a display object as described below.

At the transmitting information processing apparatus 100a, the drawing unit 24 draws a display object according to a received operation event. For example, when a page turning operation is performed on the transmitting information processing apparatus 100a, the drawing unit 24 receives the corresponding operation event and draws a page object of a destination page on the screen. Meanwhile, when a pointer operation is performed and the corresponding operation event is received, the drawing unit 24 draws a pointer object on the screen.

At the receiving information processing apparatus 100b, the drawing unit 24 draws a display object according to operational information in transmission data received via the communication control unit 11. For example, when the transmission data $23D_1$ including a page number are received, the drawing unit 24 draws a page object of a page indicated by the page number on the screen to switch pages. Meanwhile, when the transmission data $23D_2$ including coordinates are received, the drawing unit 24 draws a pointer object on the screen according to the coordinates. Thus, at the receiving information processing apparatus 100b, an input operation performed at the transmitting information processing apparatus 100a is reproduced on the screen according to received operation information.

As described above, the screen sharing function of this embodiment is implemented through collaboration among the functional units of the information processing apparatuses 100. In other words, the screen sharing function of this embodiment is implemented by executing screen sharing application programs (software for implementing the screen sharing function) installed in the information processing apparatuses 100 constituting the screen sharing system 1000. More particularly, in each information processing apparatus 100, the screen sharing application program is loaded by a processing unit (e.g., the CPU 106) from a storage unit (e.g., the HDD 108 or the ROM 105) into a memory (e.g., the RAM 104) and is executed to perform a process as described below and thereby implement the screen sharing function.

An exemplary process (collaboration among functional units) of providing a screen sharing service is described in more detail below.

<Process of Providing Screen Sharing Service>

Figure 5:
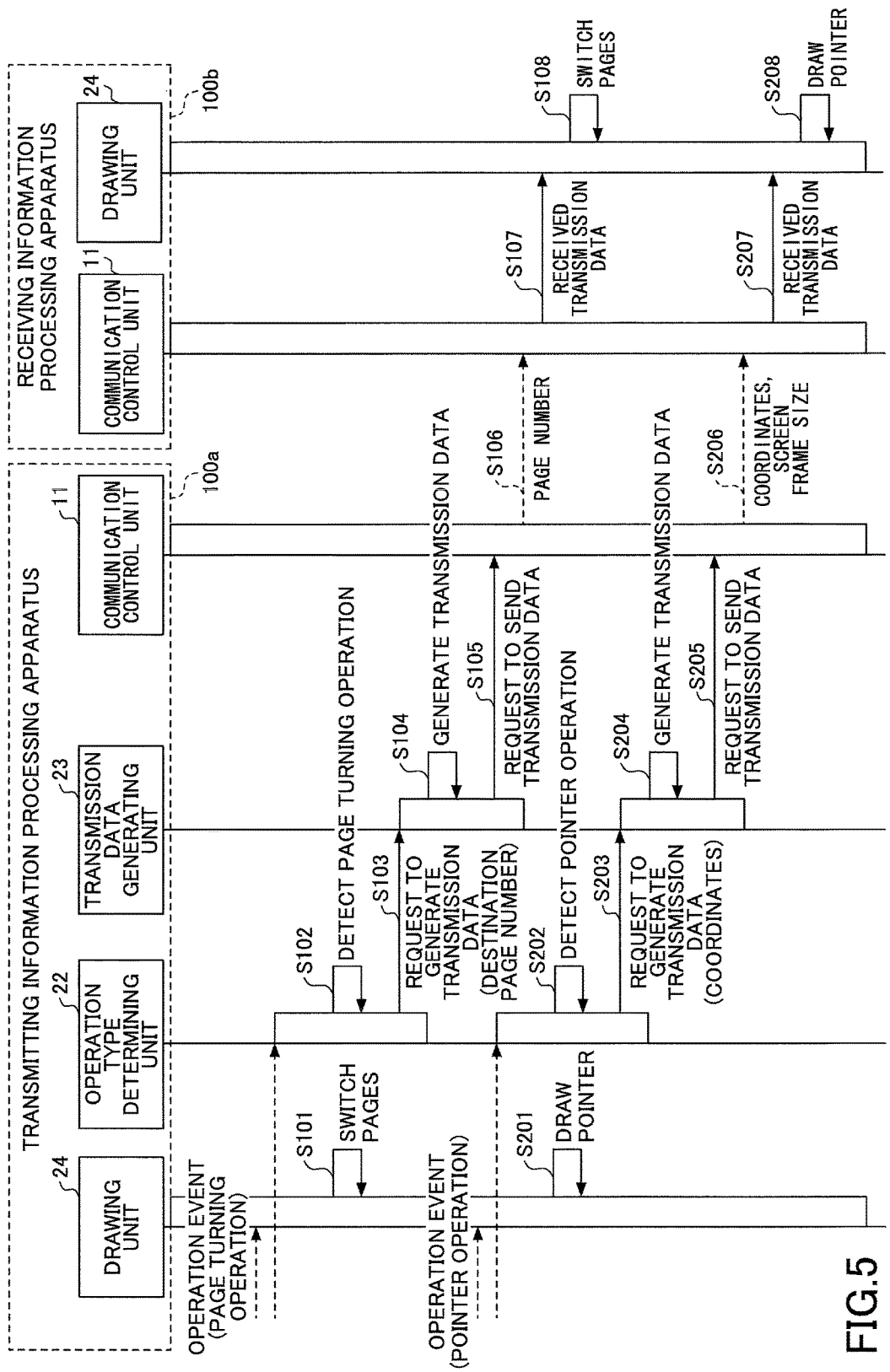
FIG. 5 is a sequence chart illustrating an exemplary process of providing a screen sharing service according to the embodiment.

FIG. 5 is a sequence chart illustrating an exemplary process of providing a screen sharing service according to the embodiment. In FIG. 5, it is assumed that the transmitting information processing apparatus 100a has acquired the operation right and transmits operational information and the receiving information processing apparatus 100b receives the operational information.

(1) Sharing Screen Reflecting Page Turning Operation

As illustrated in FIG. 5, when a page turning operation is performed on the screen of the transmitting information processing apparatus 100a, a corresponding operation event is input to the drawing unit 24 and the operation type determining unit 22.

According to the operation event, the drawing unit 24 draws a page object of a destination page to be displayed as a result of the page turning operation on the screen and thereby switches pages (step S101).

Meanwhile, the operation type determining unit determines that the performed input operation is a page turning operation based on the operation event (step S102), and requests the transmission data generating unit to generate transmission data $23D_1$ (step S103). In this step, the operation type determining unit 22 obtains the page number of the destination page from the operation event and sends the page number as operational information to the transmission data generating unit 23.

The transmission data generating unit 23 generates the transmission data $23D_1$ including the page number (step S104), and requests the communication control unit 11 to send the transmission data $23D_1$ (step S105). In this step, the transmission data generating unit 23 sends the generated transmission data $23D_1$ to the communication control unit 11.

Then, the communication control unit 11 sends the transmission data $23D_1$ including the page number of the destination page to the receiving information processing apparatus 100b (step S106). For example, the communication control unit 11 of the transmitting information processing apparatus 100a transmits the transmission data $23D_1$ according to network setting information (e.g., an Internet protocol (IP) address) of the receiving information processing apparatus 100b which is obtained in a broadcasting process.

At the receiving information processing apparatus 100b, the communication control unit 11 receives the transmission data $23D_1$ and sends the transmission data $23D_1$ to the drawing unit 24 (step S107). The drawing unit 24 draws the page object of a page corresponding to the page number in the transmission data $23D_1$ on the screen and thereby switches pages (step S108). Thus, at the receiving information processing apparatus 100b, the page turning operation performed at the transmitting information processing apparatus 100a is reproduced on the screen according to the page number in the received transmission data $23D_1$.

(2) Sharing Screen Reflecting Pointer Operation

As illustrated in FIG. 5, when a pointer operation is performed on the screen of the transmitting information processing apparatus 100a, a corresponding operation event is input to the drawing unit 24 and the operation type determining unit 22.

According to the operation event, the drawing unit 24 draws a pointer object on the screen (step S201).

Meanwhile, the operation type determining unit determines that the performed input operation is a pointer operation based on the operation event (step S202), and requests the transmission data generating unit 23 to generate transmission data $23D_2$ (step S203). In this step, the operation type determining unit 22 obtains coordinates indicating a pointer position on the screen from the operation event and sends the coordinates as operational information to the transmission data generating unit 23.

The transmission data generating unit 23 generates the transmission data $23D_2$ including the coordinates (step S204), and requests the communication control unit 11 to send the transmission data $23D_2$ (step S205). In this step, the transmission data generating unit 23 sends the generated transmission data $23D_2$ to the communication control unit 11.

When the size of the screen of the receiving information processing apparatus 100b is different from that of the transmitting information processing apparatus 100a, the transmission data $23D_2$ may also include information for adjusting the pointer position. For example, the transmission data $23D_2$ may include, in addition to the coordinates, information (screen frame information) indicating the screen frame size of the transmitting information processing apparatus 100a.

Then, the communication control unit 11 sends the transmission data $23D_2$ including the coordinates indicating the pointer position and the screen frame size to the receiving information processing apparatus 100b (step S206).

At the receiving information processing apparatus 100b, the communication control unit 11 receives the transmission data $23D_2$ and sends the transmission data $23D_2$ to the drawing unit 24 (step S207). The drawing unit 24 draws a pointer object on the screen according to the coordinates and the screen frame size in the transmission data $23D_2$ (step S208). In this step, the drawing unit 24 adjusts the drawing position of the pointer object by converting the coordinate space of the screen of the transmitting information processing apparatus 100a into the coordinate space of the receiving information processing apparatus 100b (i.e., performing coordinate transformation) based on the screen frame size in the transmission data $23D_2$ and the screen frame size of the receiving information processing apparatus 100b.

Thus, at the receiving information processing apparatus 100b, a pointer operation performed at the transmitting information processing apparatus 100a is reproduced on the screen according to the coordinates and the screen frame size in the received transmission data $23D_2$.

<Summary>

As described above, in the screen sharing system 1000 of this embodiment, the same content is displayed on the screens of information processing apparatuses. At the information processing apparatus (transmitting information processing apparatus) 100a having the operation right, the operation type determining unit 22 determines a performed input operation, the transmission data generating unit 23 generates transmission data 23D including operational information corresponding to the determined input operation, and the communication control unit 11 transmits the transmission data 23D to the information processing apparatus (receiving information processing apparatus) 100b. At the receiving information processing apparatus 100b, the communication control unit 11 receives the transmission data 23D, and the drawing unit 100 reproduces the input operation on the screen according to the operational information in the received transmission data 23D.

Thus, the screen sharing system 1000 of this embodiment makes it possible to share a display screen reflecting an input operation by exchanging a small amount of data among information processing apparatuses. This in turn makes it possible to reduce the load of communications (or communication time) among the information processing apparatuses and to reduce the processing load (or screen drawing time) of the information processing apparatuses. Accordingly, the screen sharing system 1000 of this embodiment makes it possible to achieve real-time screen sharing.

<First Variation>

A first variation of the above embodiment is described below.

FIG. 6 is a drawing illustrating an exemplary screen of a presenter and an exemplary screen of an audience. In FIG. 6, W1 indicated a display screen of a presenter and W2 indicates a display screen of an audience in a situation as illustrated in FIG. 6.

In the example of FIG. 6, the presenter (a participant having the operation right) moves a pointer object displayed on the display screen W1 from a position P1 to a position P2 during a presentation. To reproduce the pointer operation by the presenter on the display screen W2 of the audience, multiple sets of coordinates indicating pointer positions are sent and received periodically between the information processing apparatus of the presenter (transmitting information processing apparatus) and the information processing apparatus of the audience (receiving information processing apparatus) while the presenter is moving the pointer. In other words, transmission data $23D_2$ including the coordinates are sent and received between the information processing apparatuses multiple times.

In the first variation, to reduce the communication frequency and thereby reduce the communication load, transmission data including operational information are sent to the receiving information processing apparatus at once (at one time) for each pointer moving operation. Also in the first variation, even when operational information is sent at once for each input operation, a time lag between the actual input operation and the reproduction of the input operation at the receiving information processing apparatus is reduced or eliminated to achieve real-time screen sharing.

<Process of Sharing Screen Reflecting Pointer Moving Operation>

FIG. 7 is a sequence chart illustrating an exemplary process of sharing a screen when a pointer moving operation is performed.

As illustrated in FIG. 7, when a pointer moving operation is started on the screen of the transmitting information processing apparatus 100a, a corresponding operation event is input to the drawing unit 24 and the operation type determining unit 22.

According to the operation event, the drawing unit 24 starts drawing a pointer object on the screen (step S301).

Meanwhile, the operation type determining unit 22 determines that the performed input operation is a pointer moving operation based on the operation event (step S302), and sends an operation start report indicating that the pointer moving operation has been started to the transmission data generating unit 23 (step S303). In this step, the operation type determining unit obtains starting coordinates indicating a starting pointer position on the screen from the operation event and sends the starting coordinates as operational information to the transmission data generating unit 23.

When receiving the operation start report (a request to generate transmission data), the transmission data generating unit 23 starts a process as described below. The transmission data generating unit 23 starts counting operation time T1 and recording coordinates indicating pointer positions of the pointer being moved (step S304). For example, the transmission data generating unit 23 counts the operation time T1 using a clock circuit (not shown) of the transmitting information processing apparatus 100a. Also, the transmission data generating unit 23 buffers coordinates of pointer positions that are output periodically from the operation type determining unit 22 in a memory (e.g., the RAM 104). Accordingly, after a certain period of time, multiple sets of coordinates indicating a trace of the pointer being moved are temporarily stored in the memory.

When the pointer moving operation is completed on the screen of the transmitting information processing apparatus 100a, a corresponding operation event is input to the drawing unit 24 and the operation type determining unit 22. For example, when the pointer moving operation is performed by touching the screen, the completion of the pointer moving operation is detected by the input unit 101 based on whether a pointing part such as a touch pen or a finger is in contact with the screen. The input unit 101 determines that the pointer moving operation is being performed when the pointing part is in contact with the screen and determines that the pointer moving operation is completed when the pointing part is lifted from the screen.

According to the operation event (or the detection result), the drawing unit 24 stops drawing the pointer object on the screen (step S401).

Meanwhile, based on the operation event (or the detection result), the operation type determining unit 22 sends an operation end report indicating that the pointer moving operation has been completed to the transmission data generating unit 23 (step S402). In this step, the operation type determining unit 22 obtains ending coordinates indicating an ending pointer position on the screen from the operation event, sends the ending coordinates as operational information to the transmission data generating unit 23, and thereby requests the transmission data generating unit 23 to generate the transmission data $23D_2$.

When receiving the operation end report (a request to generate transmission data), the transmission data generating unit 23 stops counting the operation time T1 and recording the coordinates, and generates transmission data $23D_2$ as illustrated in FIG. 8 (step S403).

FIG. 8 is a drawing illustrating exemplary transmission data $23D_2$.

As illustrated in FIG. 8, the transmission data $23D_2$ includes sets of recorded coordinates ($x=a_1, y=b_2 \ldots x=a_n, y=b_n$), a screen frame size (fsize=W [width]×H [height]), and counted operation time (time=T1 [sec]).

Referring back to FIG. 7, the transmission data generating unit 23 outputs the generated transmission data $23D_2$ to the communication control unit 11 and requests the communication control unit 11 to send the transmission data $23D_2$ (step S404).

Then, the communication control unit 11 sends the transmission data $23D_2$ to the receiving information processing apparatus 100b (step S405). In other words, multiple sets of the coordinates (arranged in the order recorded) indicating pointer positions from the start to the end of the pointer moving operation, the screen frame size of the transmitting information processing apparatus 100a, and the operation time T1 taken for the pointer moving operation are sent to the receiving information processing apparatus 100b at once (at one time). Thus, the first variation makes it possible to reduce the frequency of communications among the information processing apparatuses and thereby reduce the communication load.

At the receiving information processing apparatus 100b, the communication control unit 11 receives the transmission data $23D_2$ and sends the transmission data $23D_2$ to the drawing unit 24 (step S406).

The drawing unit 24 calculates time (pointer object drawing time T2) for reproducing the pointer moving operation at the receiving information processing apparatus 100b (step S407). The drawing unit 24 calculates the pointer object drawing time T2 using formula 1 below:

Drawing time T2=operation time T1×adjustment factor k (formula 1)

Adjustment factor k: 0<k<1 (formula 2)

As is apparent from formula 1, the adjustment factor k is used to adjust the speed (drawing speed) of reproducing the input operation at the receiving information processing apparatus 100b.

An exemplary relationship between the operation time T1 and the adjustment factor k is described below.

Figure 9:
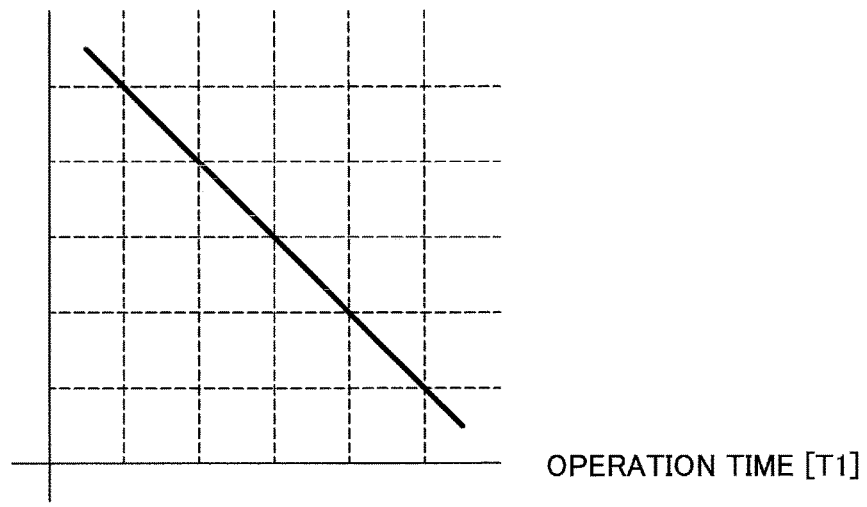
FIG. 9 is a graph illustrating an exemplary relationship between operation time and an adjustment factor according to the first variation.

FIG. 9 is a graph illustrating an exemplary relationship between the operation time T1 and the adjustment factor k. In FIG. 9, the vertical axis indicates the adjustment factor k and the horizontal axis indicates the operation time T1.

As illustrated in FIG. 9, the operation time T1 and the adjustment factor k are inversely proportional to each other. The adjustment factor k is within a range indicated by formula 2 above. When the operation time T1 is long, the adjustment factor k is set at a decimal fraction close to "0". Meanwhile, when the operation time T1 is short, the adjustment factor k is set at a decimal fraction close to "1".

Based on the above relationship and the operation time T1, the drawing unit 24 determines the adjustment factor k and calculates the drawing time T2. For example, the drawing unit 24 accesses a storage area storing data (e.g., a table) indicating the correspondence between operation time T1 and adjustment factors k, and obtains the adjustment factor k corresponding to the operation time T1. Then, the drawing unit 24 sets the obtained adjustment factor k and the operation time T1 in the transmission data $23D_2$, and thereby calculates the drawing time T2.

Thus, the drawing unit 24 determines the adjustment factor k based on the operation time T1 and adjusts the speed (drawing speed) of reproducing the input operation at the receiving information processing apparatus 100b based on the determined adjustment factor k.

Figure 10:
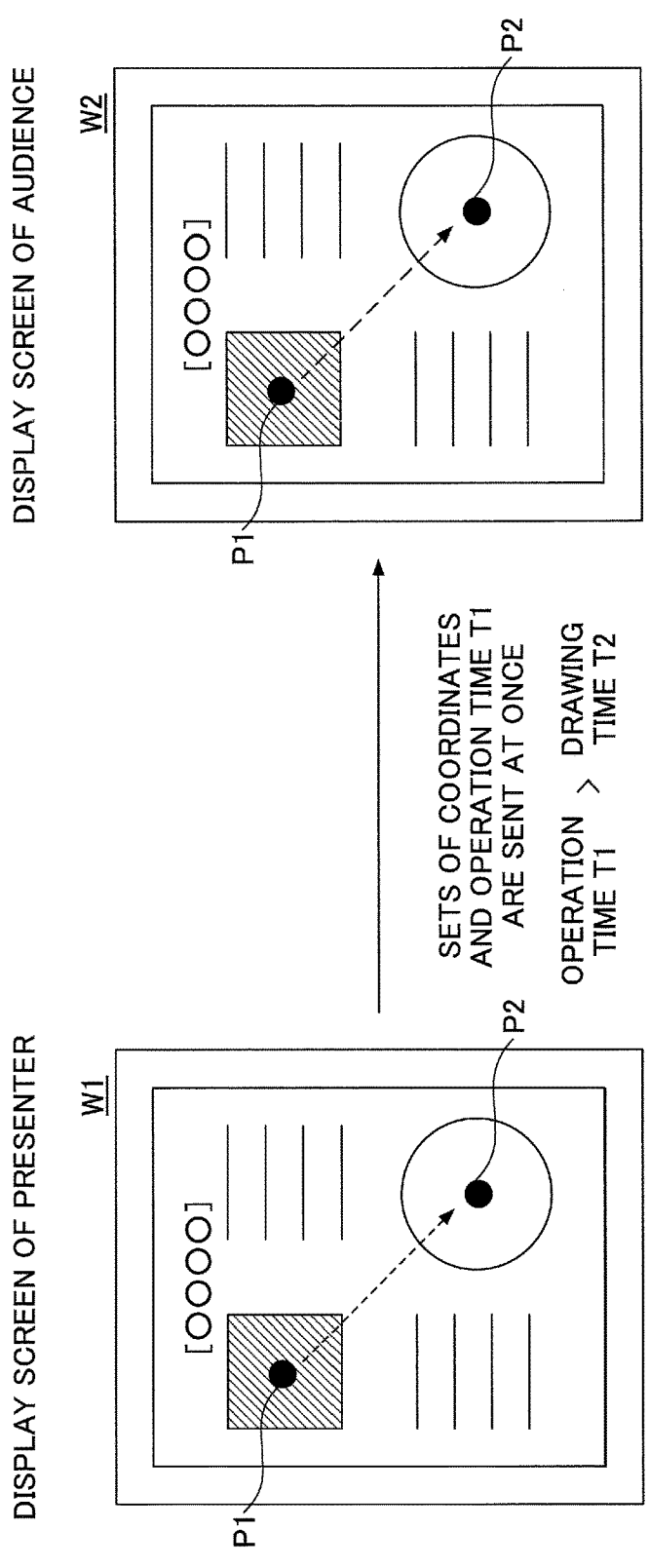
FIG. 10 is a drawing used to describe an exemplary process of sharing a screen where a pointer is moved according to the first variation.

FIG. 10 is a drawing used to describe an exemplary process of sharing a screen where a pointer is moved.

In the first variation, for example, when the operation time T1 of an input operation performed at the transmitting information processing apparatus 100a is long, drawing time T2 that is less than the operation time T1 is calculated using an adjustment factor k that is a decimal fraction close to "0" so that the drawing speed is increased.

This configuration makes it possible to reduce or eliminate the time lag between the actual input operation at the transmitting information processing apparatus and the reproduction of the input operation at the receiving information processing apparatus, and thereby makes it possible to achieve real-time screen sharing.

Referring back to FIG. 7, after calculating the drawing time T2, the drawing unit 24 starts drawing the pointer object on the screen according to the sets of coordinates (arranged in the order recorded) and the screen frame size included in the transmission data $23D_2$ (step S408). The drawing unit 24 draws the pointer object at such a speed that the drawing process is completed within the calculated drawing time T2. As a result, the pointer moving operation is reproduced at a speed higher than the speed at which the pointer moving operation has been performed at the transmitting information processing apparatus 100a.

Thus, in the screen sharing system 1000 of the first variation, transmission data including operational information are sent to the receiving information processing apparatus at once (at one time) for each input operation to reduce the communication frequency and the communication load. Also in the screen sharing system 1000 of the first variation, the speed of reproducing an input operation at the receiving information processing apparatus is adjusted to reduce or eliminate the time lag caused by sending the operational information at once and thereby achieve real-time screen sharing.

In the first variation, a pointer moving operation is used as an example. However, the first variation may also be applied to other types of input operations such as a handwriting input operation. In other words, the first variation may be applied to an input operation performed by continuously touching the screen for a certain period of time.

<Second Variation>

A second variation of the above embodiment is described below.

In the second variation, it is assumed that an audience records a personal memo on a presentation material being shared by participants of a presentation meeting while a presenter (a participant having the operation right) is performing a presentation.

For this purpose, the second variation provides a mechanism for switching shared and non-shared modes (screen sharing modes) of a display screen.

Figure 11:
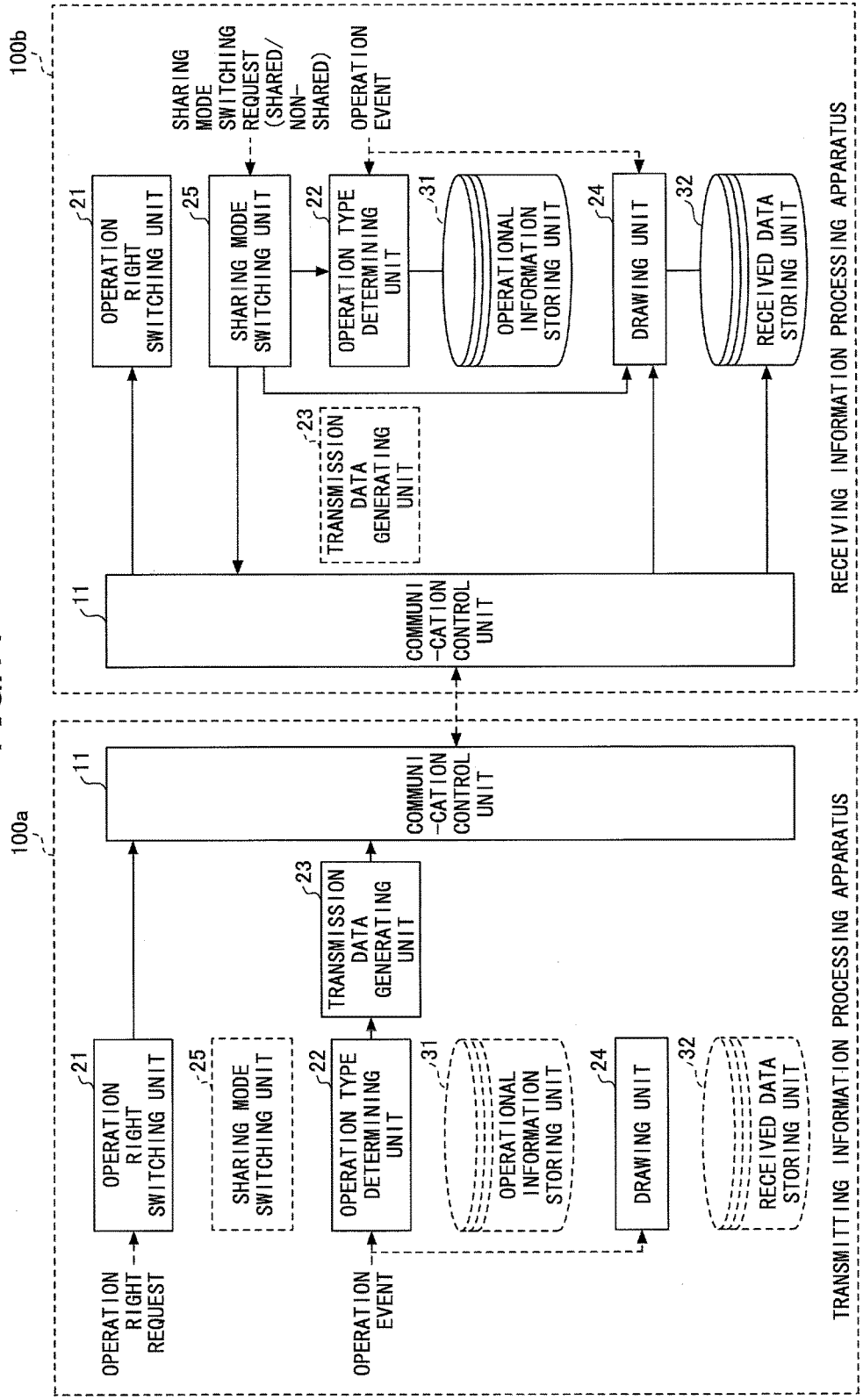
FIG. 11 is a block diagram illustrating an exemplary functional configuration of an information processing apparatus according to a second variation.

FIG. 11 is a block diagram illustrating an exemplary functional configuration of the information processing apparatus 100 according to the second variation.

The functional configuration of FIG. 11 is different from the functional configuration of FIG. 3 in that a sharing mode switching unit 25 is added.

The sharing mode switching unit 25 is a functional unit that switches shared and non-shared modes of a display screen. The sharing mode switching unit 25 displays a graphical user interface (GUI) for receiving a sharing mode switching request (a shared mode request or a non-shared mode request), and switches screen sharing modes according to the received sharing mode switching request.

In the descriptions below, it is assumed that screen sharing modes are switched at an information processing apparatus of an audience, i.e., the receiving information processing apparatus 100b.

When the non-shared mode request is received, the sharing mode switching unit 25 enables the function for receiving input operations on the information processing apparatus 100b and activates the operation type determining unit 22. At the same time, the sharing mode switching unit 25 requests the drawing unit 24 to switch the display screen from a shared screen to a personal screen. The operation type determining unit 22 receives an input operation performed on the personal screen and records operational information of the input operation in an operational information storing unit 31. The operational information storing unit 31 is, for example, implemented by a storage area of a storage unit (e.g., the HDD 108) of the information processing apparatus 100b. This configuration enables the audience to record a personal memo by performing, for example, a handwriting input operation on the information processing apparatus 100b.

Also, when receiving the non-shared mode request, the sharing mode switching unit 25 requests the communication control unit 11 to record transmission data 23D (operational information) received from the transmitting information processing apparatus 100a. The communication control unit 11 receives the transmission data 23D from the transmitting information processing apparatus 100a and records the received transmission data 23D in a received data storing unit 32. The received data storing unit 32 is, for example, implemented by a storage area of a storage unit (e.g., the HDD 108) of the information processing apparatus 100b. The storage area used for the received data storing unit 32 is different from the storage area used for the operational information storing unit 31. Thus, in the second variation, input operations on the personal screen and input operations on the shared screen are stored in different storage areas.

When the screen sharing mode is switched from the non-sharing mode to the sharing mode, the operation type determining unit 22 stops recording operational information in the operational information storing unit and is deactivated. Meanwhile, the communication control unit 11 stops recording transmission data in the received data storing unit 32, and the drawing unit 24 switches screens from the personal screen to the shared screen and reproduces input operations performed at the transmitting information processing apparatus 100a based on the transmission data stored in the received data storing unit 32.

Thus, the screen sharing function of the second variation is implemented through collaboration among the functional units of the information processing apparatuses 100.

<Process of Switching Screen Sharing Modes>

Figure 12:
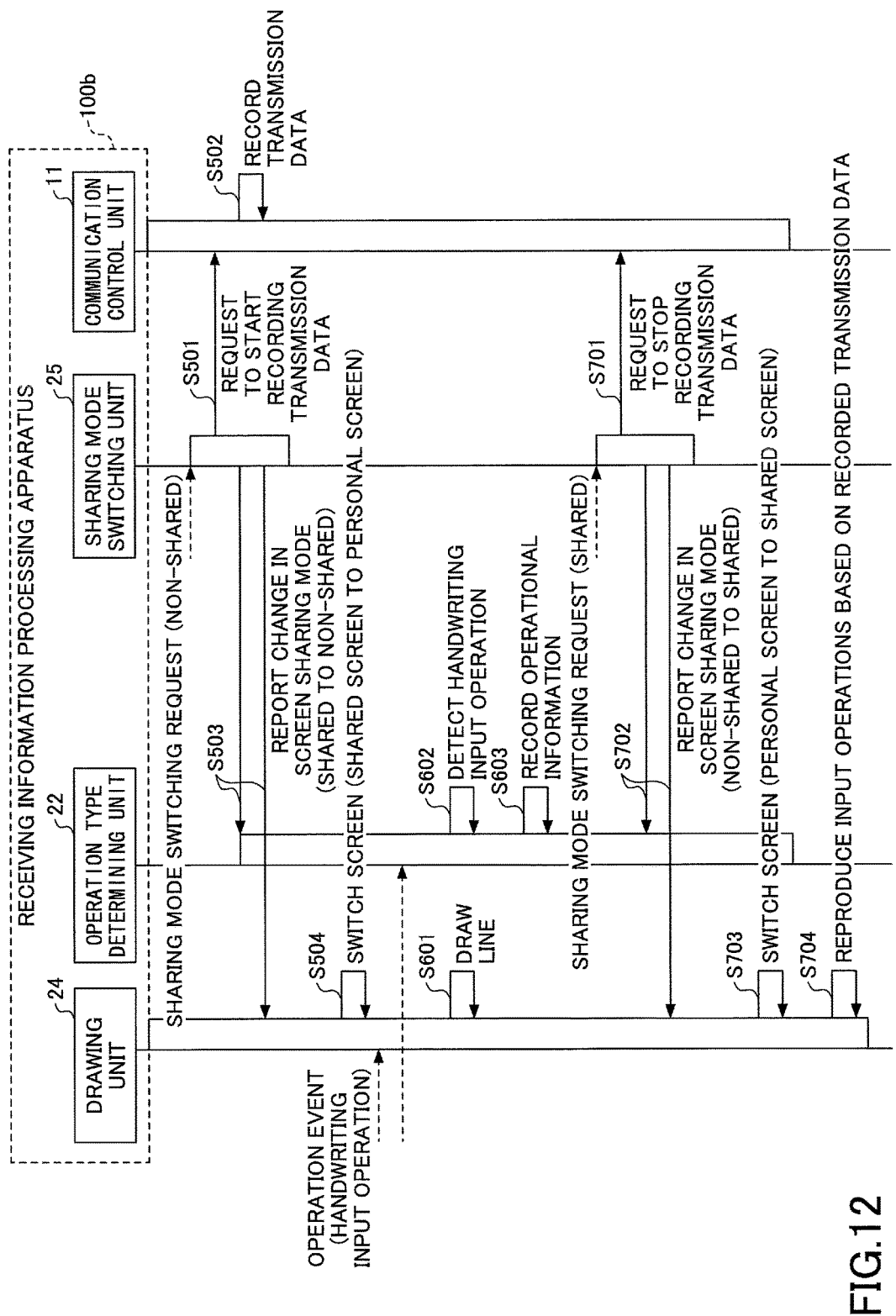
FIG. 12 is a sequence chart illustrating an exemplary process of switching screen sharing modes according to the second variation.

FIG. 12 is a sequence chart illustrating an exemplary process of switching screen sharing modes according to the second variation.

As illustrated in FIG. 12, when the non-shared mode request is entered at the receiving information processing apparatus 100b, the sharing mode switching unit 25 switches the screen sharing mode from the shared mode to the non-shared mode, and requests the communication control unit 11 to start recording transmission data 23D received from the transmitting information processing apparatus 100a (step S501).

The communication control unit 11 receives the transmission data 23D from the transmitting information processing apparatus 100a and records the received transmission data 23D in the received data storing unit 32 (step S502).

Also, the sharing mode switching unit 25 reports to the drawing unit 24 and the operation type determining unit 22 that the screen sharing mode has been switched from the shared mode to the non-shared mode (step S503).

In response, the drawing unit 24 switches the display screen from the shared screen to the personal screen (step S504).

When a handwriting input operation is performed on the personal screen, a corresponding operation event is input to the drawing unit 24 and the operation type determining unit 22.

According to the operation event, the drawing unit 24 draws a line object corresponding to the trace of handwriting on the personal screen (step S601).

Meanwhile, the operation type determining unit 22 determines that the performed input operation is a handwriting input operation based on the operation event (step S602), and records the operational information of the handwriting input operation in the operational information storing unit 31 (step S603). For example, the operation type determining unit 22 records operational information including the page number of a page on which the handwriting input operation has been performed and multiple sets of coordinates indicating the trace of handwriting (i.e., sets of coordinates forming a line).

When the shared mode request is entered at the receiving information processing apparatus 100*b*, the sharing mode switching unit 25 switches the screen sharing mode from the non-shared mode to the shared mode, and requests the communication control unit 11 to stop recording the transmission data 23D received from the transmitting information processing apparatus 100*a* (step S701). Then, the communication control unit 11 stops recording the transmission data 23D in the received data storing unit 32.

Also, the sharing mode switching unit 25 reports to the drawing unit 24 and the operation type determining unit 22 that the screen sharing mode has been switched from the non-shared mode to the shared mode (step S702). In response, the operation type determining unit 22 stops recording operational information in the operational information storing unit 31.

Meanwhile, the drawing unit 24 switches the display screen from the personal screen to the shared screen (step S703), accesses the received data storing unit 32, and reproduces input operations performed at the transmitting information processing apparatus 100*a* on the shared screen according to the operational information in the transmission data 23D stored in the received data storing unit 32 (step S704).

Thus, the screen sharing system 1000 of the second variation makes it possible to improve the convenience of the screen sharing service.

To achieve real-time screen sharing, the method or configuration of the first variation for adjusting the drawing speed at the receiving information processing apparatus may also be applied to a process in the second variation of reproducing input operations on the shared screen after the screen sharing mode is switched from the non-sharing mode to the sharing mode.

<Third Variation>

A third variation of the above embodiment is described below.

Figure 13A:
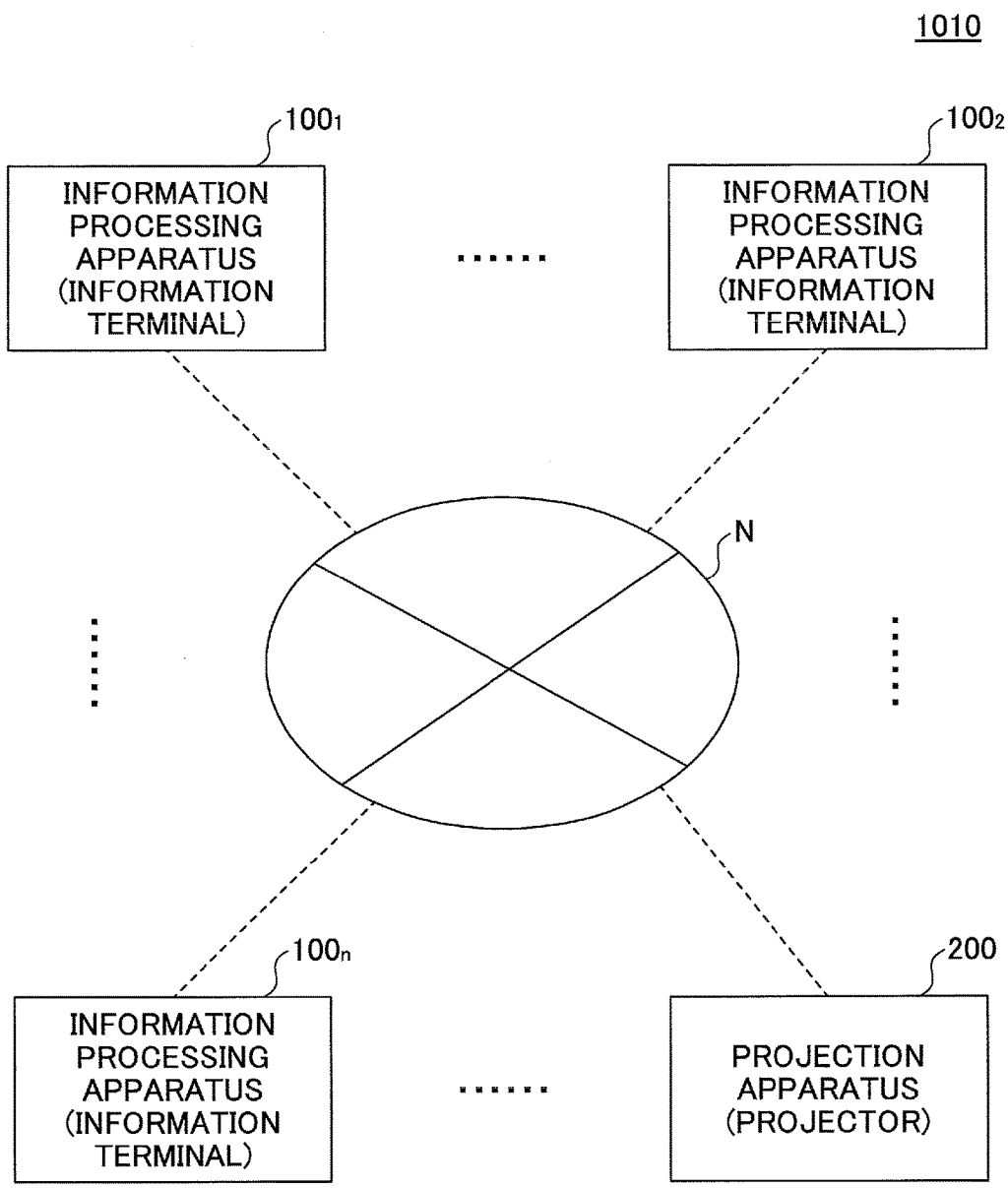
FIGS. 13A and 13B are drawings illustrating an exemplary configuration of a screen sharing system according to a third variation.
Figure 13B:
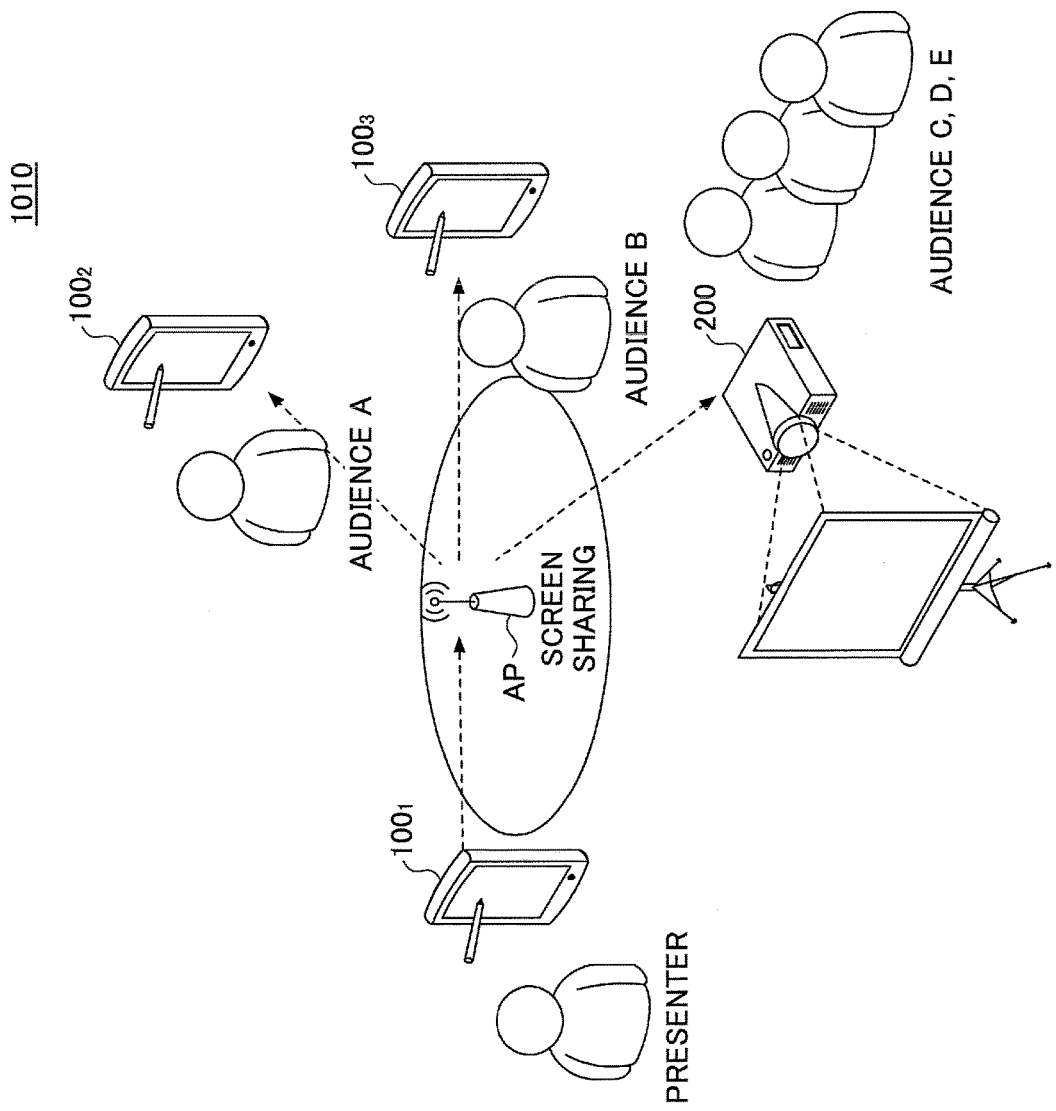

FIGS. 13A and 13B are drawings illustrating an exemplary configuration of a screen sharing system 1010 according to the third variation.

The configuration of FIG. 13A is different from the configuration of FIG. 1A in that a projection apparatus 200 is connected to the data communication channel N.

The projection apparatus 200 may be a projector that includes a radio communication function and an information display function.

FIG. 13B illustrates an exemplary case where the screen sharing system 1010 is used for a presentation meeting. In this exemplary case, the projection apparatus 200 shares a display screen with the information processing apparatus 100$_1$ of the presenter in a manner similar to the information processing apparatuses 100$_2$ and 100$_3$ of the audiences, except that the projection apparatus 200 projects the shared screen onto a projection screen.

Similarly to the information processing apparatus 100 of the above embodiment, the projection apparatus 200 includes hardware components for implementing the screen sharing function.

Figure 14:
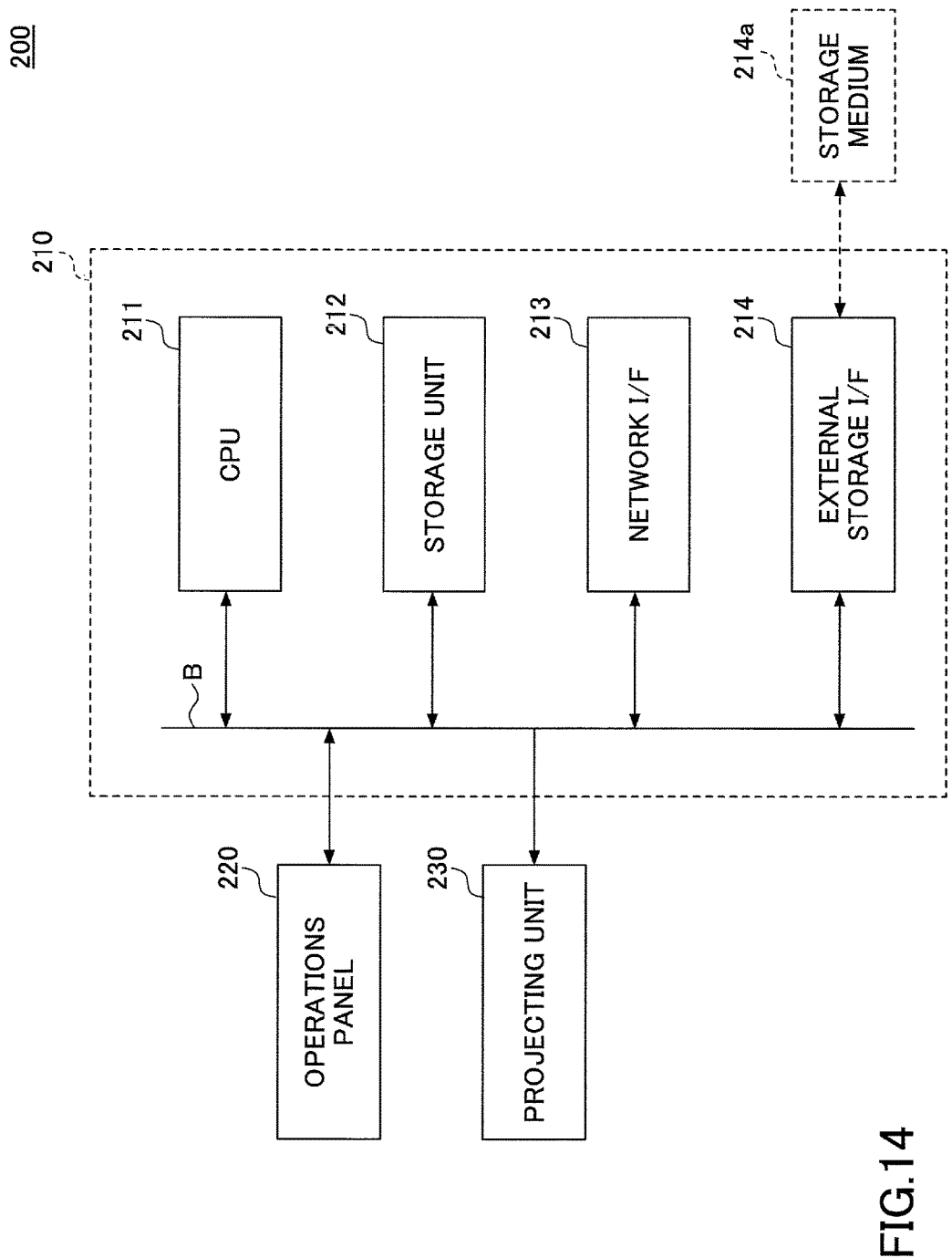
FIG. 14 is a block diagram illustrating an exemplary hardware configuration of a projection apparatus according to the third variation.

FIG. 14 is a block diagram illustrating an exemplary hardware configuration of the projection apparatus 200 according to the third variation.

As illustrated in FIG. 14, the projection apparatus 200 includes a controller 210, an operations panel 220, and a projecting unit 230 that are connected to each other via a bus B.

The operations panel 220 includes a display unit for providing information such as device information to the user and an input unit for receiving user inputs such as settings and instructions. The projecting unit 230 projects image data onto a projection screen.

The controller 210 is a control circuit board including a CPU 211, a storage unit 212, a network I/F 213, and an external storage I/F 214 that are connected via the bus B.

The storage unit 211 includes a RAM, a ROM, and an HDD for storing programs and data. The CPU 212 loads programs and data from the ROM and the HDD into the RAM and executes the loaded programs to control the projection apparatus 200 and thereby implement various functions.

The network I/F 213 is an interface for connecting the projection apparatus 200 to the data communication channel N. The projection apparatus 200 can perform data communications with the information processing apparatuses 100 via the network I/F 213.

The external storage I/F 214 is an interface for connecting a storage medium 214*a* used as an external storage to the projection apparatus 200. Examples of the storage medium 214*a* include an SD memory card, a USB memory, a CD, and a DVD. The projection apparatus 200 can read and write data from and to the storage medium 214*a* via the external storage I/F 214.

In the projection apparatus 200 with the hardware configuration as described above, the CPU 211 loads a screen sharing application program (software for implementing the screen sharing function) from the HDD or the ROM into the RAM and executes the loaded screen sharing application program to implement the screen sharing function.

The screen sharing system 1010 of the third variation also provides advantageous effects similar to those provided by the screen sharing system 1000 of the above embodiment.

The screen sharing function of the above embodiment and variations may be implemented by executing programs by processing units (e.g., CPUs) of apparatuses (i.e., the information processing apparatuses 100 and the projection apparatus 200) constituting the screen sharing system 1000/1010. The programs may be written in a programming language(s) supported by the operating environments (platforms) of the apparatuses.

The programs to be executed by the information processing apparatus 100 and the projection apparatus 200 may be stored in non-transitory computer-readable storage media (e.g., the storage medium 103*a* and the storage medium 214*a*), and may be installed into the information processing apparatus 100 via the drive unit 103 and into the projection apparatus 200 via the external storage I/F 214. Alternatively, the programs may be installed via a telecommunication line and the interface unit 107 into the information processing apparatus 100, and may be installed via a telecommunication line and the network I/F 213 into the projection apparatus 200.

An aspect of this disclosure provides a screen sharing system, a screen sharing method, and a storage medium storing a program that make it possible to share a display screen reflecting an input operation by exchanging a small amount of data.

The present invention is not limited to the specifically disclosed embodiments, and variations and modifications may be made without departing from the scope of the present invention.

What is claimed is:

1. A system, comprising:
a plurality of information processing apparatuses that are connected to each other via a network, wherein
each information processing apparatus of the information processing apparatuses includes
a display,
a memory that stores a program, and
a processor configured to execute the program stored in the memory to perform a process including
obtaining a content to be shared by the information processing apparatuses,
displaying the obtained content on a shared screen displayed on the display,
receiving a setting for allowing an input operation performed on the content displayed on the shared screen to be reproduced on the same content displayed on shared screens of other information processing apparatuses of the information processing apparatuses,
when the information processing apparatus is set as a transmitting information processing apparatus, sending operational information indicating the input operation performed on the content displayed on the shared screen to the other information processing apparatuses,
when the information processing apparatus is set as a receiving information processing apparatus, receiving, from another information processing apparatus of the information processing apparatuses, operational information indicating an input operation performed on the content displayed on the shared screen of the another information processing apparatus, and performing a drawing operation to reproduce the input operation indicated by the received operational information on the content displayed on the shared screen of the information processing apparatus;
when the setting is received at a presenter information processing apparatus of the information processing apparatuses which is operated by a presenter, the presenter information processing apparatus activates a function to receive the input operation on the content displayed on the shared screen of the presenter information processing apparatus, and is thereby set as the transmitting information processing apparatus;
in response to receiving the setting, the presenter information processing apparatus also sends a report to the other information processing apparatuses to cause the other information processing apparatuses to deactivate the function to receive the input operation; and
when the report is received, each of the other information processing apparatuses deactivates the function to receive the input operation and is thereby set as the receiving information processing apparatus.

2. The system as claimed in claim 1, wherein the processor obtains the content from one of a storage of the information processing apparatus and an external storage.

3. The system as claimed in claim 1, wherein
the process further includes switching the display between a shared mode and a non-shared mode according to a switching request from a user;
when the display is switched from the shared mode to the non-shared mode, each of the other information processing apparatuses activates the function to receive the input operation, switches the shared screen to a personal screen to accept an input operation, and stores the operational information received from the transmitting information processing apparatus in a first storage; and
when the display is switched from the non-shared mode to the shared mode, each of the other information processing apparatuses deactivates the function to receive the input operation, switches the personal screen to the shared screen, and reproduces the input operation on the content displayed on the shared screen according to the operational information stored in the first storage.

4. The system as claimed in claim 3,
wherein while the display is in the non-shared mode, each of the other information processing apparatuses stores operational information indicating the input operation received via the personal screen in a second storage different from the first storage.

5. The system as claimed in claim 1, wherein
the content includes multiple pages; and
when a page turning operation is received from a user, the processor sends, as the operational information, page identification information indicating a page to be displayed as a result of the page turning operation to the other information processing apparatuses.

6. The system as claimed in claim 1, wherein
when a pointer operation is received from a user, the processor sends, as the operational information, pointer position information indicating a position of a pointer on the shared screen to the other information processing apparatuses.

7. The system as claimed in claim 1, wherein each of the information processing apparatuses is a smartphone or a tablet PC.

8. The system as claimed in claim 1, further comprising:
a projection apparatus connected via the network to the information processing apparatuses,
wherein the projection apparatus is configured to receive the operational information sent from the transmitting information processing apparatus, and to draw and project a display object on a screen according to the received operational information.

9. The system as claimed in claim 1, wherein
the network is a wireless LAN;
the information processing apparatuses are configured to detect a same access point to connect to the wireless LAN; and
the presenter information processing apparatus broadcasts the report to the other information processing apparatuses to cause the other information processing apparatuses to deactivate the function to receive the input operation.

10. The system as claimed in claim 1, wherein
the process further includes
determining whether the input operation performed on the content displayed on the shared screen is a page turning operation or a pointer operation, and
generating transmission data including the operational information indicating the input operation based on a result of the determining;
in the sending, the generated transmission data is sent to the other information processing apparatuses; and functions to perform the determining and the generating are activated at the transmitting information processing apparatus and are deactivated at the receiving information processing apparatus.

11. A method for a system including a plurality of information processing apparatuses that are connected to each other via a network, the method comprising:

by each information processing apparatus of the information processing apparatuses, obtaining a content to be shared by the information processing apparatuses, displaying the obtained content on a shared screen of the information processing apparatus, receiving a setting for allowing an input operation performed on the content displayed on the shared screen to be reproduced on the same content displayed on shared screens of other information processing apparatuses of the information processing apparatuses, when the information processing apparatus is set as a transmitting information processing apparatus, sending operational information indicating the input operation performed on the content displayed on the shared screen to the other information processing apparatuses, and when the information processing apparatus is set as a receiving information processing apparatus, receiving, from another information processing apparatus of the information processing apparatuses, operational information indicating an input operation performed on the content displayed on the shared screen of the another information processing apparatus, and performing a drawing operation to reproduce the input operation indicated by the received operational information on the content displayed on the shared screen of the information processing apparatus, wherein when the setting is received at a presenter information processing apparatus of the information processing apparatuses which is operated by a presenter, the presenter information processing apparatus activates a function to receive the input operation on the content displayed on the shared screen of the presenter information processing apparatus, and is thereby set as the transmitting information processing apparatus;

in response to receiving the setting, the presenter information processing apparatus also sends a report to the other information processing apparatuses to cause the other information processing apparatuses to deactivate the function to receive the input operation; and when the report is received, each of the other information processing apparatuses deactivates the function to receive the input operation and is thereby set as the receiving information processing apparatus.

12. An information processing apparatus for a system including a plurality of information processing apparatuses that are connected to each other via a network, the information processing apparatus comprising:

a display;

a memory that stores a program; and a processor configured to execute the program stored in the memory to perform a process including obtaining a content to be shared by the information processing apparatuses including the information processing apparatus, displaying the obtained content on a shared screen displayed on the display, receiving a setting for allowing an input operation performed on the content displayed on the shared screen to be reproduced on the same content displayed on shared screens of other information processing apparatuses of the information processing apparatuses, when the information processing apparatus is set as a transmitting information processing apparatus, sending operational information indicating the input operation performed on the content displayed on the shared screen to the other information processing apparatuses, when the information processing apparatus is set as a receiving information processing apparatus, receiving, from another information processing apparatus of the information processing apparatuses, operational information indicating an input operation performed on the content displayed on the shared screen of the another information processing apparatus, and performing a drawing operation to reproduce the input operation indicated by the received operational information on the content displayed on the shared screen of the information processing apparatus; wherein when the setting is received, the information processing apparatus activates a function to receive the input operation on the content displayed on the shared screen, and is thereby set as the transmitting information processing apparatus; and in response to receiving the setting, the information processing apparatus also sends a report to the other information processing apparatuses to cause each of the other information processing apparatuses to deactivate the function to receive the input operation, and to be set as the receiving information processing apparatus.

* * * * *